United States Patent Office 3,109,537
Patented Nov. 5, 1963

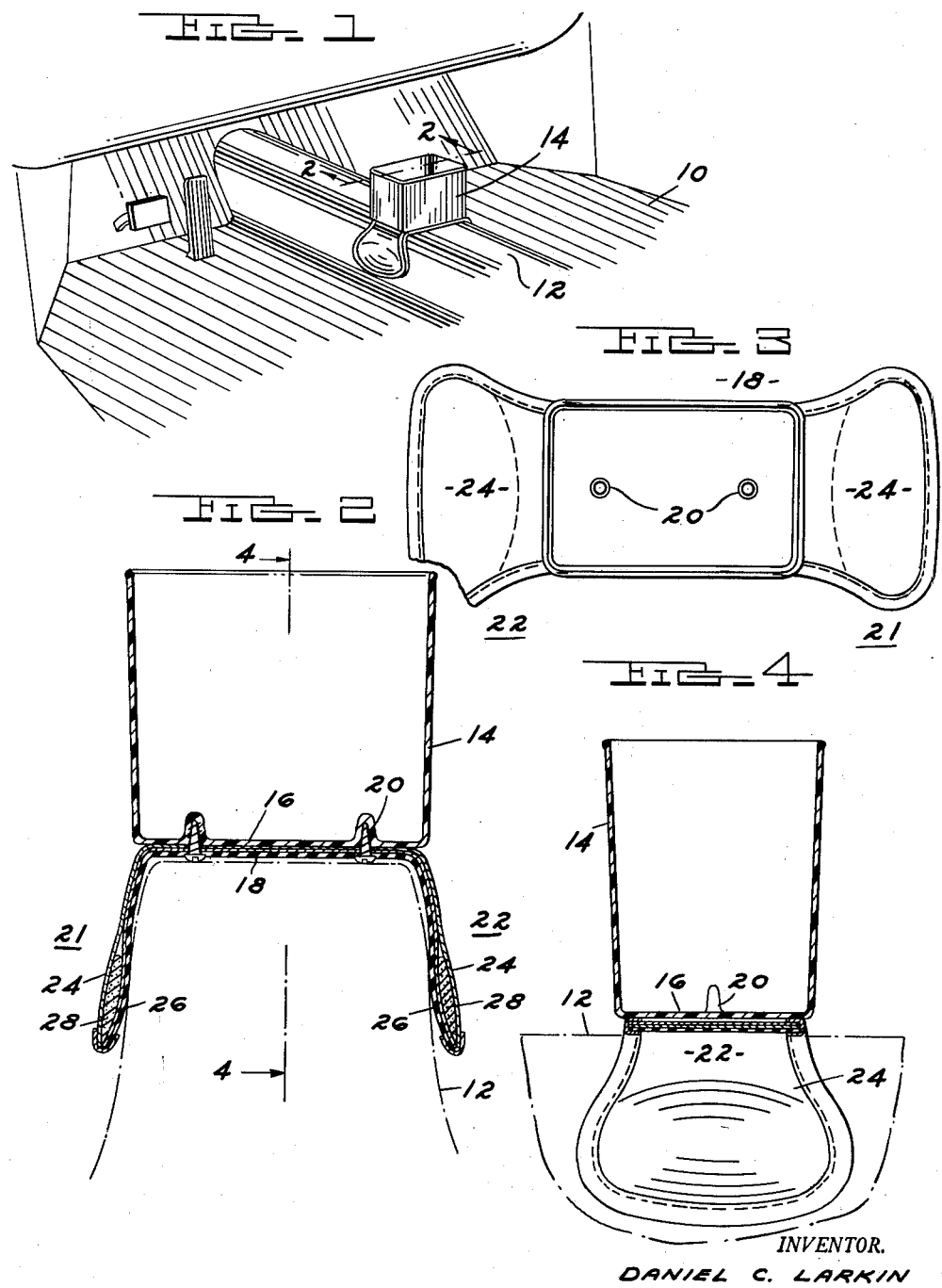

3,109,537
REFUSE CONTAINER FOR MOTOR VEHICLE BODY
Daniel Charles Larkin, 3134 Woodstock, Detroit, Mich.
Filed July 19, 1961, Ser. No. 125,136
1 Claim. (Cl. 206—19.5)

This invention relates to a refuse container adapted for use within a motor vehicle body and particularly designed to be removably supported upon the tunnel-like ridge that is commonly found in present day motor vehicle bodies and extends linearly along the center line of the floor between the two front seats. Obviously the container might be employed for any purpose and might be supported in any desirable location.

In closed motor vehicle bodies, the storage compartment, such as the glove compartment, is small and filled with usable articles. It is not desirable nor good taste to throw refuse from the windows of automobiles and along the highway. In many localities it is against the law. It is not uncommon for people to keep a bag or the like within a car to contain used cleansing tissues, empty cartons or the like. Such provision, however, is not wholly satisfactory because the interior of closed bodies is occupied by so many articles that are used by the occupants that suitable disposition of the bag is difficult.

The instant container is designed to be supported in the upright open position upon the top of the tunnel or ridge that commonly extends linearly along the center line of the floor of closed automobile bodies and is located for convenient use.

While such container is particularly provided as a receptacle for refuse, it is obvious that if desired it may be used for containing other articles and might be provided with a suitable cover or lid.

More particularly, an object is the provision of a container of the character set forth wherein a supporting element is secured to the bottom of the container and projects beyond opposite ends thereof. The projecting opposite ends of this supporting element are adapted to hang as flaps downwardly from such opposite ends. These end extensions are weighted and flexible so as to drape over opposite sides of the tunnel ridge to support the receptacle in the upright open position upon said tunnel ridge.

Another meritorious feature is that the container may be supported upon a flat floor with the end extensions projecting outwardly away from opposite ends of the container and substantially within the plane of the body thereof.

Other objects, advantages, and meritorious features of the invention will more fully appear from the following description, claim, and accompanying drawing wherein:

FIG. 1 is a perspective of a portion of the floor area in a closed vehicle body forwardly of the front seat showing my receptacle supported upon the top of the tunnel ridge extending linearly along the center line of the floor of the body;

FIG. 2 is a cross-sectional view taken on the line 2—2 of FIG. 1;

FIG. 3 is a top plan view of the structure shown in FIG. 1 with the end extensions of the supporting element projecting outwardly away from the receptacle and substantially normal to the end walls thereof;

FIG. 4 is a cross-sectional view taken on the line 4—4 of FIG. 2.

In the drawing, a fragment of the interior floor area of an automobile closed body forwardly of the front seat is indicated in FIG. 1. The floor itself is indicated as 10. At 12 there is shown a conventional tunnel ridge commonly in use which extends linearly along the center line of the body between the two front seats. The top of this tunnel ridge 12 is used to support my refuse container device.

This container comprises a box-like receptacle 14. This receptacle is shown as open at the top, though obviously it might be provided with a cover if such were desired. The receptacle itself may be formed of any suitable material such as plastic, metal, paper, or fibrous composition material. Preferably the receptacle is light in weight and of relatively rugged construction, and the material of which it is formed is inexpensive.

There is secured to the bottom 16 of the receptacle a supporting element 18. Such securement may be by screws 20 or any other suitable means such as rivets or the like. The element 18 is provided with opposite end extensions 21 and 22 which project beyond the bottom portion 18 as shown in the figures of the drawing.

This element 18 may be formed of any suitable material, but plastic sheet material or artificial leather may be used for the top layer 24, and for the bottom layer 26 a sponge rubber or similar plastic sheet having a non-smooth frictional surface may be employed. Such sponge rubber or plastic frictional layer causes the same to frictionally adhere to the supporting surface and resist sliding thereover.

The element 18 which is secured to the bottom of the receptacle 14 has its end extensions in the form of flexible flaps of a bag-like character, and such are partially filled with weighted material 28 such as sand, metal pellets, or the like. This material 28 is shiftable within the hollow end extensions so that these extensions serve, in the form of flaps, to drape over the opposite sides of the tunnel 12 as shown in FIGS. 1 and 2. These weighted end extension flaps hold the receptacle in the upright position upon the top of the tunnel ridge as shown. The extension flaps 21 and 22 are illustrated in FIGS. 3 and 4 as having a width somewhat greater than the actual width of the receptacle. The extension flaps may also be disposed within substantially the plane of the bottom of the receptacle if it is desired to place the same on a flat surface such as a floor or desk. Normally, the flexibility of the element 18 and the extension flaps is such that they hang downwardly from opposite ends of the receptacle as shown particularly in FIG. 2.

What I claim is:

A refuse container for an automobile body having a linearly extending tunnel hump comprising, in combination, a container box open at the top and having opposite side and end walls closed at the bottom by a flat bottom wall, and an integrally formed flexible box supporting strap and complementary flaps at each end thereof having an intermediate portion of said strap secured to said box bottom wall at two points spaced inwardly from said opposite side walls of the box and outwardly of a median linear line of said box bottom wall, said complementary flaps adapted to fall downwardly free from said box bottom wall extending away from said points of securement and draping independently over the top and adjacent side wall portions of said tunnel hump, the outer ends of said complementary flaps being hollow and containing a weighted loose granular material freely shiftable therein and conformable to varying contours of the tunnel hump as the said complementary flaps drape thereover, said outer hollow ends of the flaps containing said weighted material having a width greater than the longitudinal dimension of the box itself, said box supporting strap and complementary flaps having their undersides provided with a sponge rubber facing adapted to frictionally engage the tunnel hump.

References Cited in the file of this patent

UNITED STATES PATENTS

| | | |
|---|---|---|
| 1,738,557 | Beiling | Dec. 10, 1929 |
| 2,219,974 | Bellow | Oct. 29, 1940 |
| 2,916,184 | Hartley | Dec. 8, 1959 |
| 2,988,206 | Olson | June 13, 1961 |

FOREIGN PATENTS

| | | |
|---|---|---|
| 240,359 | Great Britain | Oct. 1, 1925 |
| 360,186 | Great Britain | Nov. 5, 1931 |
| 571,939 | Great Britain | Sept. 14, 1945 |